(12) United States Patent
Albert

(10) Patent No.: US 8,251,589 B2
(45) Date of Patent: Aug. 28, 2012

(54) LINEAR ROLLER BEARING WITH BONDED ROLLING SURFACE PARTS

(75) Inventor: Ernst Albert, Sand (DE)

(73) Assignee: Robert Bosch GmbH, Stuttgart (DE)

( * ) Notice: Subject to any disclaimer, the term of this patent is extended or adjusted under 35 U.S.C. 154(b) by 404 days.

(21) Appl. No.: 12/575,795

(22) Filed: Oct. 8, 2009

(65) Prior Publication Data

US 2010/0092114 A1 Apr. 15, 2010

(30) Foreign Application Priority Data

Oct. 15, 2008 (DE) .......... 10 2008 051 682

(51) Int. Cl.
*F16C 19/00* (2006.01)
*F16C 17/00* (2006.01)
*G01L 3/14* (2006.01)

(52) U.S. Cl. ............ 384/56; 384/8; 384/59; 73/862.322

(58) Field of Classification Search .......... 384/8, 50, 384/55, 56, 59; 73/862.322; 156/291, 306.6, 156/313
See application file for complete search history.

(56) References Cited

U.S. PATENT DOCUMENTS

| | | | | |
|---|---|---|---|---|
| 3,646,682 A | * | 3/1972 | Edwin | 42/144 |
| 5,059,037 A | * | 10/1991 | Albert | 384/45 |
| 5,076,875 A | | 12/1991 | Padden | |
| 5,281,029 A | * | 1/1994 | Morita | 384/8 |
| 5,302,225 A | | 4/1994 | Padden | |
| 6,948,851 B2 | | 9/2005 | Rossteuscher et al. | |
| 8,021,235 B2 | * | 9/2011 | Tinnin et al. | 464/167 |
| 2005/0087970 A1 | | 4/2005 | Ulintz | |
| 2007/0137378 A1 | | 6/2007 | Bastein et al. | |
| 2008/0253703 A1 | | 10/2008 | Michioka et al. | |
| 2009/0136164 A1 | | 5/2009 | Pfeuffer et al. | |

FOREIGN PATENT DOCUMENTS

| | | |
|---|---|---|
| DE | 818 280 | 10/1951 |
| DE | 33 47 407 | 7/1984 |
| DE | 20 2004 002 258 | 6/2004 |
| DE | 103 03 948 | 8/2004 |
| DE | 103 43 685 | 4/2005 |
| DE | 10 2004 051 670 | 5/2005 |
| DE | 10 2007 056 862 | 5/2009 |
| EP | 1 808 608 | 7/2007 |
| GB | 2224683 A * | 5/1990 |

* cited by examiner

*Primary Examiner* — Thomas R Hannon
*Assistant Examiner* — Adam D Rogers
(74) *Attorney, Agent, or Firm* — Michael J. Striker

(57) ABSTRACT

A guide carriage for a linear roller bearing is supportable in a longitudinally displaceable manner via a large number of rolling elements on a guide rail which extends in a longitudinal direction, and has at least one rolling surface part including at least one carriage rolling surface for the rolling elements and is attached to a main body of the guide carriage via at least one adhesive layer, and a thin sheet-metal panel which has at least one opening is located between the rolling surface part and the main body, with the adhesive layer located inside the opening.

12 Claims, 2 Drawing Sheets

LINEAR ROLLER BEARING WITH BONDED ROLLING SURFACE PARTS

CROSS-REFERENCE TO A RELATED APPLICATION

The invention described and claimed hereinbelow is also described in German Patent Application DE 10 2008 051 682.1 filed on Oct. 15, 2008. This German patent application, whose subject matter is incorporated here by reference, provides the basis for a claim of priority of invention under 35 U.S.C. 119(a)-(d).

BACKGROUND OF THE INVENTION

The present invention relates to a guide carriage for a linear roller bearing Linear roller bearings in the sense of the present invention are, e.g., bearing rail guides, roller rail guides, bearing bushes, and ball splines.

The disadvantage of the state of the art is that the adhesive/force-fit connection requires a great deal of space, since a special projection that engages in a groove in the main body must be provided on the rolling surface part. In addition, various adhesive supply channels must be provided in the guide carriage in order to create the adhesive layer, and these adhesive supply channels are difficult to create. Furthermore, it is not possible using the proposed solution to create an adhesive layer having just any thickness, and therefore the stiffness of the linear roller bearing is reduced anyway.

EP 1 808 608 A1 makes known a further linear roller bearing, in the case of which separate rolling surface parts which are bonded to a main body of the guide rail are provided on the guide rail. According to FIG. 8 in EP 1 808 608 A1, one of the rolling surface parts bears directly against a stop edge of main body of guide rail. The adhesive layer is provided only on the other side of stop edge. The purpose of stop edge is to orient rolling surface part relative to the main body of the guide rail. A stop edge of this type is not provided on opposite rolling surface part. Instead, rolling surface part is moved into the desired position using gauge, so that the rail rolling surfaces for the rolling elements have the clearance required to ensure that the guide function of the linear roller bearing is smooth and exact.

The disadvantage of the design according to EP 1 808 608 A1 is that the adhesive layers are very thick, with the result that the stiffness of the linear roller bearing is greatly reduced. It should also be pointed out that the aforementioned stop edge is very narrow and is located off-center, and so transfers barely any load at all and therefore does not increase stiffness.

SUMMARY OF THE INVENTION

The object of the present invention is to provide an adhesive connection that has increased stiffness. The installation space required for the guide carriage should not be increased as a result.

According to the invention, it is provided that a thin sheet-metal panel which includes at least one opening is located between the rolling surface part and the main body, and the adhesive layer is located inside the opening.

Accordingly, the rolling surface part is supported directly over the sheet-metal panel on the main body, so that the stiffness of the sheet-metal panel is a decisive factor for the overall stiffness of the linear roller bearing, while the stiffness of the adhesive layer steps into the background.

The adhesive is located in the openings in the sheet-metal panel, and its function is essentially to hold the rolling surface part in position, that is, to essentially prevent the rolling surface part from becoming displaced traversely relative to the plane of the sheet-metal panel. The overall cross-sectional area of the openings and the supporting surface of the thin sheet-metal panel are matched to one another such that the linear roller bearing has the desired level of stiffness, while the adhesive layer reliably performs its holding function. The thickness of the thin sheet-metal panel corresponds to the thickness of the adhesive layer and is therefore very thin. Accordingly, the present adhesion requires very little space. The thin sheet-metal panel is preferably a flat sheet-metal panel that is installed between flat surfaces of the assigned rolling surface part and the main body. The sheet-metal panel preferably has a shape that is adapted to the rolling surface part, and, in particular, the width of the sheet-metal part is essentially equal to the width of the rolling surface part. The greatest possible stiffness of the linear roller bearing is obtained as a result.

Within the scope of the present application, "openings" are understood to mean that the sheet-metal panel includes an opening that is situated transversely to the plane of the sheet-metal panel. Accordingly, protection is also sought for openings that are open toward the side of the sheet-metal panel.

A large number of openings that are preferably formed in the thin sheet-metal panel using a photochemical etching method is provided. The purpose of the large number of openings is to ensure that the load transfer between the rolling surface part and the main body takes place such that it is distributed as evenly as possible. Since the sheet-metal panel according to the present invention is very thin, the large number of openings may be created in the thin sheet-metal panel in one working step using a photochemical etching method, thereby ensuring that the sheet-metal panel is particularly cost-effective to manufacture. Particularly preferably, the sheet-metal panel is manufactured using a continual etching method, thereby resulting in a substantially endless sheet-metal panel that may simply be cut to the desired length. The manufacturing costs may be reduced further as a result.

The very thin sheet-metal panel may be composed of hardened spring steel in order to ensure that it is not plastically deformed by the strains that occur during operation of the linear roller bearing. Plastic deformations of this type may result in dimensional changes to the guide carriage, which, in turn, reduce the accuracy of guidance of the linear roller bearing. This applies, in particular, to cases in which stress concentrations occur over small surface areas, which could result in the flow limit of the sheet-metal panel being exceeded at the applicable points.

The sheet-metal panel may have a thickness between 20 µm and 200 µm. The adhesive layer in the openings therefore has a thickness that has particularly favorable load-transferring properties. At the same time, the openings in a sheet-metal panel of this type may be easily created using the aforementioned etching process.

The at least one opening may be substantially rectangular in design, with the longer side of the rectangle extending parallel to the longitudinal direction. The rolling surface part is preferably an elongated component that extends parallel to the longitudinal direction. As mentioned above, the intention is to cover the entire surface of the thin sheet-metal part with openings as evenly as possible to ensure that load is transferred as evenly as possible. At the same time, however, the size of the openings should not fall below a certain minimum size, to ensure that the adhesive may be easily inserted into the openings.

The proposed rectangular openings may be easily formed in the thin sheet-metal panel next to one another and one behind the other relative to the longitudinal direction, with openings formed evenly across the entire sheet-metal panel. The length of the rectangles is preferably between 5 and 20 times as great as their width. When the rectangles are referred to as being substantially rectangular, this means that unavoidable roundings of the corners of the rectangle should not be excluded from the scope of protection. In the case of very narrow rectangles, roundings of this type may extend entirely across a complete, short side of the rectangle, thereby resulting in an oblong-shaped rectangle.

Several parallel rows of rectangular openings that are offset relative to one another may be provided. This results in a particularly flexible sheet-metal panel that is capable of easily adapting to possible uneven areas in the assigned rolling surface part and the main body without plastic deformations occurring.

The longitudinal extension of the thin sheet-metal panel is shorter than the longitudinal extension of the rolling surface part, and the sheet-metal panel is situated such that a self-supporting region that is not supported by the sheet-metal panel is present on at least one, and preferably on both longitudinal ends of the rolling surface part. DE 103 03 948 A1 makes known to provide a rolling surface part of a linear roller bearing with a self-supporting region on the end, thereby resulting in a particularly interference-free entry of the rolling element. This self-supporting region may be created in a particularly cost-favorable manner using the proposed embodiment. The aforementioned thickness of the sheet-metal panel is sufficient to allow the deformations to occur.

A sensor that outputs a signal as a function of the force exerted by the rolling elements on the rolling surface part may be located in at least one opening of the thin sheet-metal panel. In the case of a linear roller bearing, there is a need to regularly determine the force exerted upon it. This may take place, e.g., by installing a pressure-sensitive sensor, e.g., a piezoceramic sensor, between the rolling surface part and the main body. A suitable receptacle must be provided for a sensor of this type, so that only a portion of the force transferred by the rolling surface part acts on the sensor.

The purpose of this is to prevent the stiffness of the linear roller bearing from being reduced by the presence of the sensor. Another purpose is to avoid overloading the sensor. This goal may be attained in a particularly cost-favorable manner by locating the sensor, preferably a piezoceramic sensor, in an opening in the thin sheet-metal panel. The corresponding opening for the sensor preferably has a shape that is adapted to the requirements of the sensor and that deviates from the shape of the openings for the adhesive.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

A linear roller bearing according to the present invention may be created by starting with the linear roller bearing known from DE 10 2007 056 862 and replacing the carriage rolling surfaces designed as single pieces with the main body with the rolling surface parts which are described below and include the carriage rolling surfaces. DE 10 2007 056 862 is therefore referenced in entirety and is incorporated in the contents of the present application.

Figure 1:
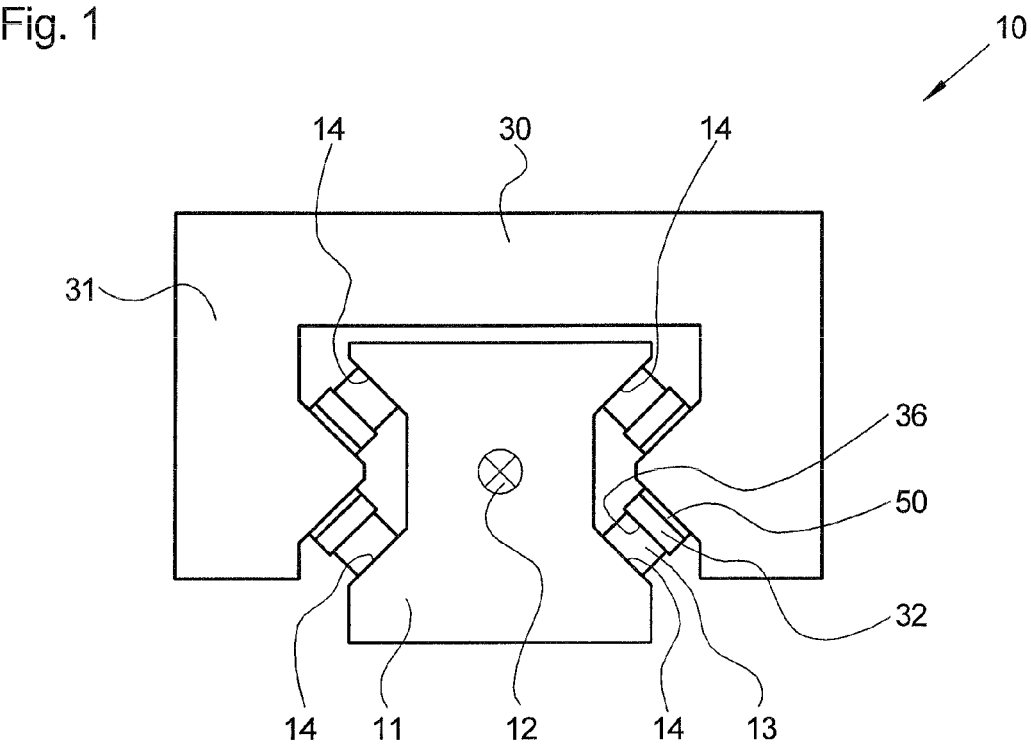
FIG. 1 shows a basic schematic cross section of a linear roller bearing according to the present invention.

FIG. 1 shows a basic schematic cross section of a linear roller bearing 10 according to the present invention. Linear roller bearing 10 includes a guide rail which is composed of hardened roller bearing steel and extends in a longitudinal direction 12; longitudinal direction 12 is oriented perpendicularly to the plane of the drawing. Guide rail 11 has a substantially constant cross-sectional shape along its entire longitudinal extension; a total of four flat rail rolling surfaces 14 are provided for the substantially circular-cylindrical rolling elements 13.

Guide carriage 30 has a substantially U-shaped cross-sectional shape; it wraps around guide rail 11 via its two "U" legs in such a manner that its four carriage rolling surfaces 36 are parallel to, are situated at a distance from, and are diametrically opposed to assigned rail rolling surfaces 14, so that rolling elements 13 are accommodated between aforementioned rolling surfaces 14; 36 with a predefined preload. Rolling elements 13 are provided in the form of four endlessly circulating rows situated at a 90° slant relative to one another, with the result that linear rolling bearing 10 has the same load-bearing capacity in every load direction.

Carriage rolling surfaces 36 are each provided on a separate rolling element part 32 composed of hardened roller bearing steel; every rolling surface part 32 is designed as a rectangular prism. Rolling surface parts 32 are supported via a thin, non-woven, flat sheet-metal panel 50 with a continuous surface according to the present invention, on U-shaped steel main body 31 of the guide carriage; the adhesive layer described below is also present in this region. The adhesive layer is also necessary, e.g., to ensure that the grinding of four carriage rolling surfaces 36 may take place when assigned rolling surface parts 32 are already installed in main body 31, thereby enabling their relative position to be attained in a particularly exact manner. During operation of the roller bearing, the rolling surface parts are held in position solely via the preload forces of rolling elements 13. In this case, the adhesive layer serves only to prevent the rolling surface parts from gradually wandering relative to the main body. Wandering of this type may be caused, e.g., by the vibrations that occur during operation of the linear roller bearing.

Figure 2:
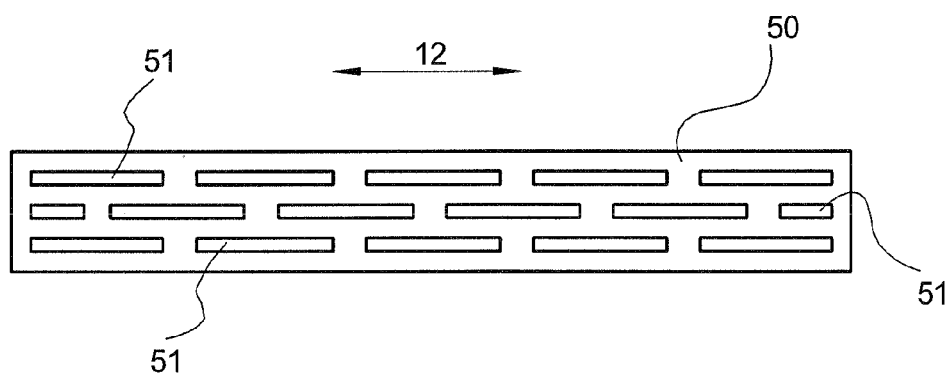
FIG. 2 shows a top view of the thin sheet-metal panel.

FIG. 2 shows a top view of thin sheet-metal panel 50 which is composed of hardened spring steel, and which has a thickness of approximately 50 μm. The rectangular shape of the sheet-metal panel is adapted to the assigned rolling surface part, in particular with regard for the width. Several rows of rectangular openings 51 are formed in the sheet-metal panel, and adjacent rows are offset relative to one another in longitudinal direction 12. Openings 51 are created using a photochemical etching process.

In this procedure, a layer of photosensitive lacquer is first applied to both sides of sheet-metal panel 51, and the rectangular pattern is exposed onto the lacquer layer using a mask. Next, the photoresist is developed, and it is removed from the exposed areas, i.e., the areas where openings 51 to be etched are located, and it is left on the remaining unexposed areas. The sheet-metal panels treated in this manner are immersed in an acid—thereby etching away the metal at the points where no photoresist is present—until openings result. Finally, the remaining photoresist is removed from the sheet-metal panel.

Figure 3:
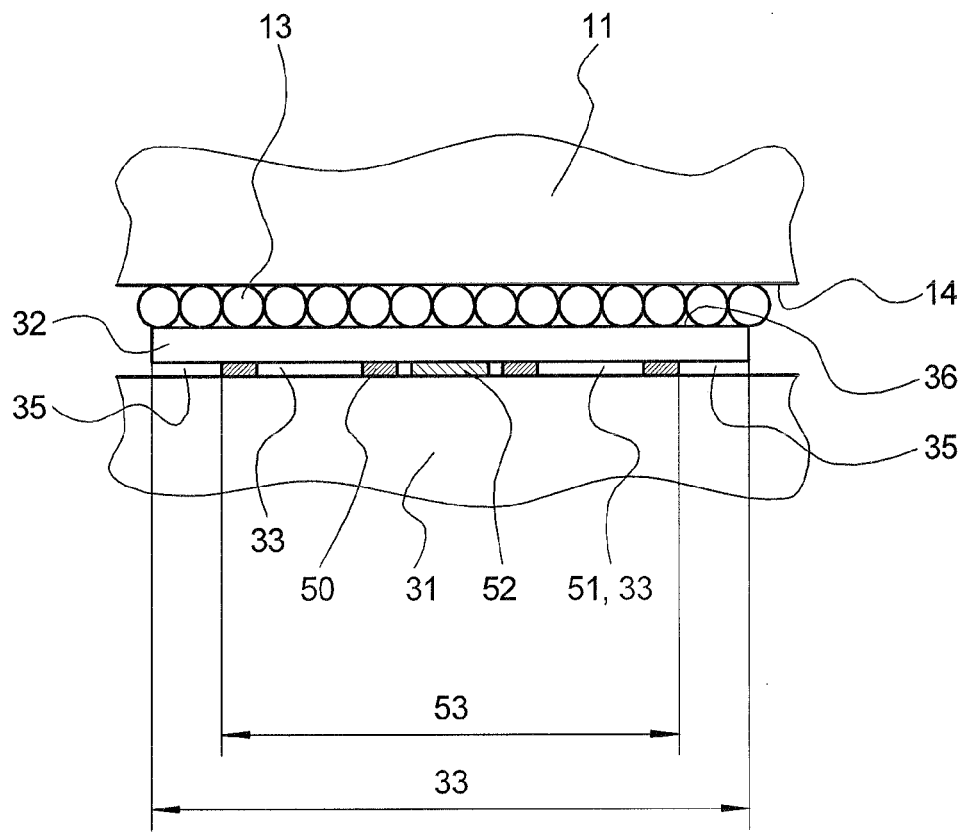
FIG. 3 shows a basic schematic longitudinal view of a linear roller bearing according to the present invention.

FIG. 3 shows a basic schematic longitudinal view of a linear roller bearing according to the present invention, in the region of the supporting rolling contact. In the figure it is shown how the row of rolling elements 13 is located between rail rolling surface 14 of guide rail 11 and carriage rolling surface 36 of rolling surface part 32. Rolling surface part 32 is supported on main body 31 of the guide carriage via thin sheet-metal panel 50 according to the present invention. It should be pointed out that the cutting plane in FIG. 3 extends through the center of openings 51, so that only the segments of sheet-metal panel 50 located between the openings are shown. Longitudinal extension 53 of sheet-metal panel 50 is shorter than longitudinal extension 33 of rolling surface part 32, so that rolling surface part 32 includes a self-supporting region 35 at both ends that is not supported by sheet-metal panel 50. The rolling surface part may therefore be bent downwardly by preload forces of rolling elements 13, thereby resulting in a run-in bevel for rolling elements 13 which results in a particularly gentle running of the linear roller bearing.

Openings 51 are filled with an adhesive, thereby resulting in several adhesive layers 33, the thickness of which corresponds to the thickness of the sheet-metal panel. To apply the adhesive, sheet-metal panel 50 is immersed in the liquid adhesive; the adhesive is held in openings 51 via surface tension. Next, the excess adhesive on the surface of sheet-metal panel 51 is wiped away, so that the sheet-metal panel may lie directly on the adjacent components. In the next step, the sheet-metal panel that was pretreated in this manner is installed between assigned rolling surface part 32 and the main body, and these components are fixed in position until the adhesive has hardened. Once adhesion is complete, carriage rolling surfaces 36 are ground while main body 31 is clamped in position, to ensure that the relative position of carriage rolling surfaces 36 may be created in a particularly exact manner.

A piezoceramic sensor 52 is located in one of the openings 51. Piezoceramic sensor 52 generates an electrical voltage as a function of the compression force that acts on it. Using the sensor, it is therefore possible to determine the force that rolling elements 13 exert on rolling surface part 32. This force may be used, in turn, to deduce the external load that acts on the linear roller bearing. Optionally, to this end, an appropriate sensor may be installed on every rolling surface part 32 in order to detect directionally variable forces.

Figure 4:
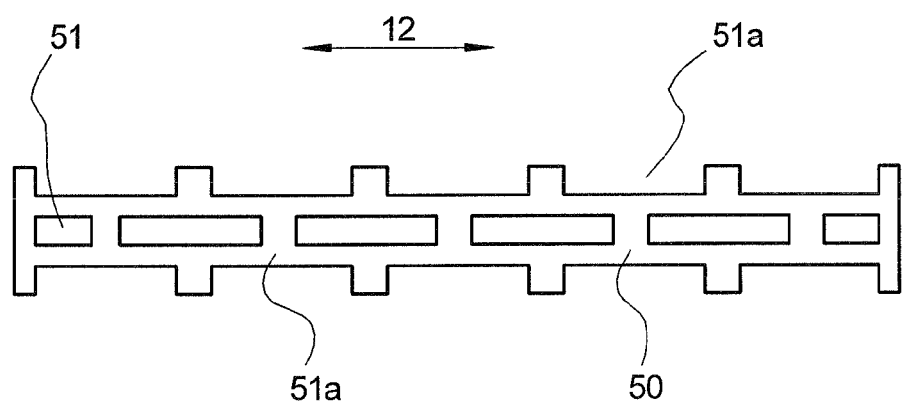
FIG. 4 shows a top view of a second embodiment of the thin sheet-metal panel.

FIG. 4 shows a second embodiment of thin sheet-metal panel 50. It differs from the embodiment shown in FIG. 2 in that, in addition to openings 51 in the center of sheet-metal panel 50, it also includes openings 51a that are open toward the side of sheet-metal panel 50.

It will be understood that each of the elements described above, or two or more together, may also find a useful application in other types of constructions differing from the types described above.

While the invention has been illustrated and described as embodied in a linear roller bearing with bonded rolling surface parts, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A guide carriage for a linear roller bearing which is supportable in a longitudinally displaceable manner via a plurality of rolling elements on a guide rail extending in a longitudinal direction, the guide carriage comprising:
   at least one rolling surface part including at least one carriage rolling surface for the rolling elements;
   a main body;
   at least one adhesive layer via which said at least one rolling surface part is attached to said main body; and
   a sheet-metal panel having a non-woven, flat, continuous surface, said sheet-metal panel including at least one opening located between said at least one rolling surface part and said main body, said at least one adhesive layer being located inside said at least one opening, wherein said sheet-metal panel has a thickness between 20 μm and 200 μm.

2. The guide carriage as defined in claim 1, wherein said sheet-metal panel includes a plurality of said openings.

3. The guide carriage as defined in claim 2, wherein said plurality of openings in said sheet-metal panel are configured as photochemically etched openings.

4. The guide carriage as defined in claim 1, wherein said sheet-metal panel is composed of hardened spring steel.

5. The guide carriage as defined in claim 1, wherein said at least one opening is substantially rectangular and has a longer side extending parallel to said longitudinal direction.

6. The guide carriage as defined in claim 1, wherein said sheet-metal panel has a plurality of said openings, wherein said openings are rectangular and are located in several parallel rows which are offset relative to one another.

7. The guide carriage as defined in claim 1, wherein said sheet-metal panel has a longitudinal extension which is shorter than a longitudinal extension of said at least one rolling surface part, said sheet-metal panel being situated such that a self-supporting region that is not supported by said sheet-metal panel is present on at least one of said rolling surface part.

8. The guide carriage as defined in claim 7, wherein said self-supporting region that is not supported by said sheet-metal panel is present on both longitudinal ends of said rolling surface part.

9. The guide carriage as defined in claim 1, further comprising a sensor that outputs a signal as a function of a force that said plurality of rolling elements exert on said at least one rolling surface part, said sensor being located in said at least one opening of said sheet-metal panel.

10. A linear roller bearing, comprising: a guide rail extending in a longitudinal direction; and a guide carriage supported in a longitudinally displaceable manner via a plurality of rolling elements and configured as recited in claim 1.

11. The guide carriage as defined in claim 1, wherein the main body and the sheet-metal panel are made of a same material.

12. The guide carriage as defined in claim 1, wherein the material is steel.

* * * * *